United States Patent
Etherington et al.

(10) Patent No.: US 7,679,528 B1
(45) Date of Patent: Mar. 16, 2010

(54) MODULATION OF AIRCRAFT GUIDANCE LIGHTS

(75) Inventors: Timothy J. Etherington, Cedar Rapids, IA (US); Arlen E. Breiholz, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 461 days.

(21) Appl. No.: 11/494,939

(22) Filed: Jul. 28, 2006

(51) Int. Cl.
*G08B 21/00* (2006.01)

(52) U.S. Cl. ............... 340/945; 340/951; 340/956; 701/1; 701/120

(58) Field of Classification Search ........... 340/945, 340/947, 951–956; 701/1, 120; 434/30, 434/38, 41, 42; 342/36, 29, 410
See application file for complete search history.

(56) References Cited

U.S. PATENT DOCUMENTS

| | | | |
|---|---|---|---|
| 3,648,229 A * | 3/1972 | Burrows et al. ............. 340/956 |
| 3,984,069 A | 10/1976 | Heyworth |
| 4,040,004 A | 8/1977 | Walpole |
| 4,210,930 A * | 7/1980 | Henry ......................... 348/117 |
| 4,291,294 A * | 9/1981 | Chase ......................... 340/951 |
| 4,449,073 A | 5/1984 | Mongoven et al. |
| 4,554,543 A * | 11/1985 | Wyatt et al. ................. 340/948 |
| 5,289,110 A | 2/1994 | Slevinsky |
| 5,374,932 A | 12/1994 | Wyschogrod et al. |
| 5,519,618 A | 5/1996 | Kastner et al. |
| 5,588,387 A * | 12/1996 | Tellington .................. 114/261 |
| 5,659,475 A * | 8/1997 | Brown ........................ 701/120 |
| 5,670,848 A | 9/1997 | Lidstrom |
| 5,825,021 A | 10/1998 | Uemura |
| 5,926,115 A * | 7/1999 | Schleder et al. ............. 340/953 |
| 6,232,602 B1 * | 5/2001 | Kerr ............................ 250/330 |
| 6,411,890 B1 * | 6/2002 | Zimmerman ................. 701/120 |
| 6,720,890 B1 * | 4/2004 | Ezroni et al. ................. 340/945 |
| 6,731,226 B2 * | 5/2004 | Walter ......................... 340/972 |
| 6,928,363 B2 * | 8/2005 | Sankrithi ..................... 701/120 |
| 7,046,160 B2 * | 5/2006 | Pederson et al. ....... 340/815.45 |
| 7,196,329 B1 * | 3/2007 | Wood et al. ................. 250/330 |
| 7,357,530 B2 * | 4/2008 | Wang et al. ............. 362/249.01 |
| 2005/0231381 A1 * | 10/2005 | Pederson et al. ....... 340/815.45 |

FOREIGN PATENT DOCUMENTS

JP 02003141700 A * 5/2003
JP 2003187400 A * 7/2003

* cited by examiner

*Primary Examiner*—Daniel Previl
(74) *Attorney, Agent, or Firm*—Matthew J. Evans; Daniel M. Barbieri

(57) ABSTRACT

An aircraft landing and/or taxiing system has a plurality of landing zone, runway, and/or taxiway lights capable of receiving information signals and transmitting optically signals representative of the information signals. A processing system for providing the information signals to the plurality of lights is also used. The system also comprises a sensor tuned to receive light of a specific range of wavelengths, the light being emitted from the lights. Also, a processing system coupled to the sensor and configured with software to interpret signals received by the sensor is used. Program code runs on the processing system. The program code is configured to determine the location of an aircraft on the taxiway based on the light signal received from one or more of the taxiway lights. Also, the aircraft landing and/or taxiing system utilizes modulated lights to provide information pertinent to aircraft landing and/or taxiing operations.

16 Claims, 3 Drawing Sheets

MODULATION OF AIRCRAFT GUIDANCE LIGHTS

BACKGROUND

Conventionally, aircraft runways are identified by having boundaries which are identified by runway lights. These runway lights are conventionally incandescent bulbs encased in a weatherproof fixture. The Federal Aviation Administration (FAA) is considering replacing standard runway lights with high intensity light emitting diode (LED) runway lights. There are a number of reasons, including cost savings, that are compelling for the FAA to make such a change. The change would likely be phased, occurring over a seven year time frame in the absence of other drivers. If additional airport capacity could be shown, the time frame may be moved up. An additional component that the FAA may consider is for the LED lights to be modulated (for example through pulse coding) so that they can be detected at greater ranges by electronic imaging systems and to make them very distinct from all other light sources to ensure that the correct runway lights are detected. Different runways may be coded differently so that aircraft crew members could ensure that they were landing on the correct runway, on 16L and not 16R, for example. With coded light the LED's may potentially be detected electronically in today's equivalent of a 300-foot runway visual range (RVR) fog at Portland or SEATAC, for example. This would provide a substantially 100% landing capability and could even allow a head-up-display-monitored automatic landing even at WAAS or CAT I ILS facilities.

An imaging sensor with a sufficiently high frame rate may permit the pulse coding of the individual LED's to be detected and decoded, effectively implementing a matched filter for the LED modulation patterns. This would improve the ability of the imaging sensor to reliably detect and identify the runway lights in the presence of obscurants like fog. The end result could be a clean image of only the airport lights that can be presented on the head-up display (HUD) and head-down display (HDD). Computer analysis of the geometry of the runway lights in this image can provide independent verification of the position and attitude of the aircraft with respect to the runway. This additional independent information can be used to certify a landing system based on GPS or ILS to operate safely in lower visibility conditions than would otherwise be possible.

In addition to runway lighting, airports are conventionally provided with similar lights along either side of each taxi way to facilitate movement of aircraft between the runways and the terminal area. These lights are conventionally colored differently (blue) from runway lights (red) and are not as bright. As there are often many taxiways with correspondingly many intersections, it can be difficult for pilots to maintain an awareness of their position on the airport surface, particularly at night. The same modulation techniques that facilitate location and identification of the correct runway described above could also be applied to the taxi-way lighting system.

While the above description addresses the application of LED runway lights in a civil environment, military runways differ in that where the civil runway should be clearly visible to all aircraft in its vicinity, it may be desired that the military runway be easily visible only to friendly aircraft. A military runway or landing zone that is difficult for the enemy to see is correspondingly difficult to attack.

The techniques herein below extend to those embodiments which fall within the scope of the appended claims, regardless of whether they accomplish one or more of the above-mentioned needs.

SUMMARY

What is provided is an aircraft. The aircraft comprises a sensor tuned to receive light of a specific range of wavelengths, the light being emitted by one or more taxiway lights and the taxiway lights having an informational signal modulated thereon. The aircraft also comprises a processing system coupled to the sensor and configured with software to interpret signals received by the sensor. Further, the aircraft comprises program code running on the processing system, the program code configured to determine the location of the aircraft on the taxiway based on the information modulated on the light signal received from one or more of the taxiway lights.

What is also provided is an aircraft taxiing system that has a plurality of taxiway lights capable of receiving information signals and transmitting optically signals representative of the information signals. A processing system for providing the information signals to the plurality of taxiway lights is also used. The system also comprises a sensor tuned to receive light of a specific range of wavelengths, the light being emitted from the taxiway lights. Also, a processing system coupled to the sensor and configured with software to interpret signals received by the sensor is used. Program code runs on the processing system. The program code is configured to determine the location of an aircraft on the taxiway based on the light signal received from one or more of the taxiway lights.

Further, what is provided is a landing system. The landing system comprises one or more landing zone or runway lights each landing zone or runway light transmitting a modulated signal. The landing system also comprises an aircraft equipped with sensing equipment capable of receiving and interpreting the modulated signals received from the landing zone or runway lights. Further, the landing system comprises a communication device on the aircraft configured to provide feedback information to a runway light controller. The landing zone or runway light controller controls the output intensity of the landing zone or runway lights based on the feedback information.

Alternative exemplary embodiments relate to other features and combination of features and combination of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which.

DETAILED DESCRIPTION

Figure 1:
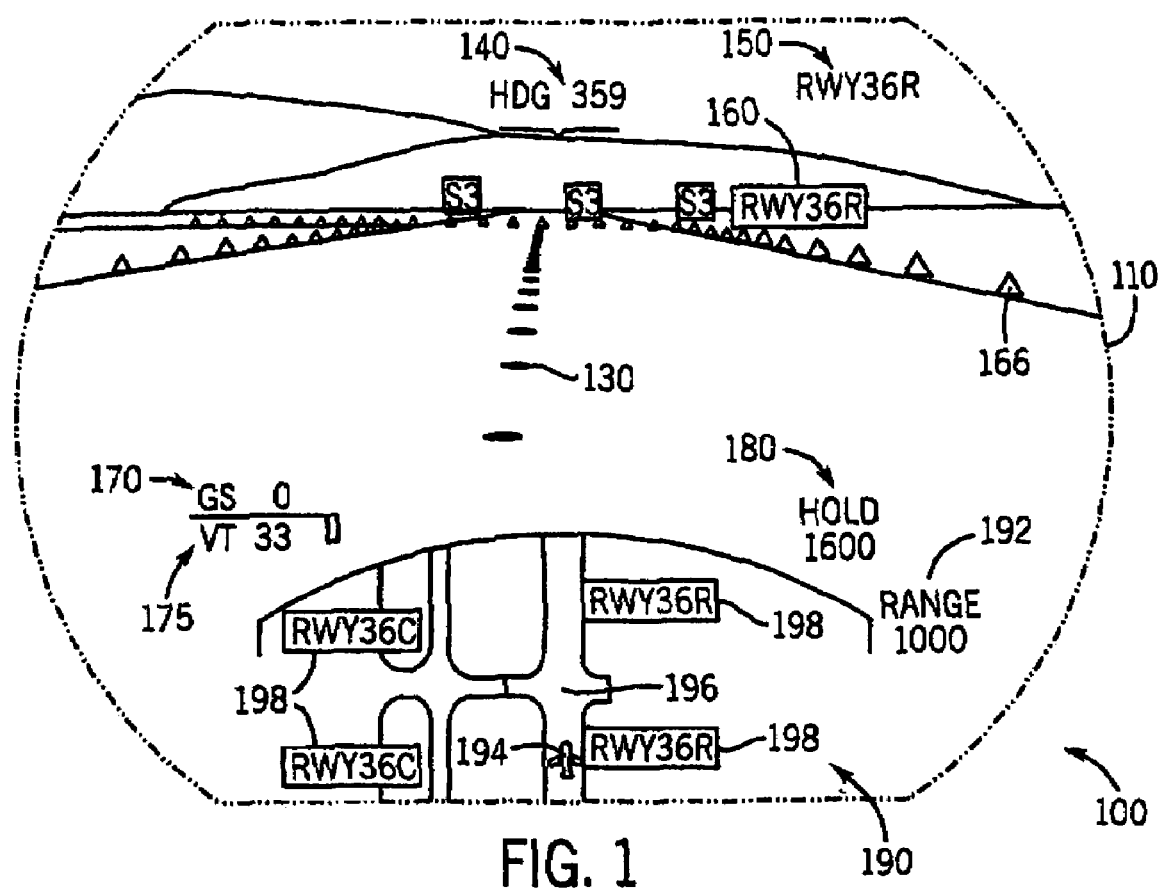
FIG. 1 is an exemplary embodiment of a head-up display providing enhanced information for a surface guidance system (SGS)

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claim.

Referring now to FIG. 1, a view 100 out of a cockpit window is depicted. Within view 100 is depicted a combiner 110 for a head-up display. Combiner 110 has conformally displayed thereon information pertaining to the boundaries and other features of the airport runway and taxiways. For example, the outside boundaries are depicted as triangular icons 120. The center of the runway or taxiway is depicted as triangles 130 which are oriented differently than triangles 120. Heading information 140 is provided. The runway 150 on which the aircraft is traveling is also provided. The information such as triangles 120 and triangles 130 are conformally mapped on the display such that they line up closely with the actual outside view. In other exemplary embodiments, the symbology used and location and appearance of information on the combiner may differ without departing from the scope of the invention. Also, it may be appreciated that the use of a head-up display is only a single example of a possible embodiment, other types of displays may similarly be used without departing from the scope of the invention.

In a particular exemplary embodiment, airport signs, such as runway airport sign 160 are provided. These runway signs may be conformally mapped to the actual runway signs found at the location in the pilot's view. The mapping is created by locating the aircraft, via GPS or other location means, a database is referenced to determine the location of particular signs within the pilot's view and the location of the sign is mapped thereon. The text of the sign is enhanced such that it may be readable by a pilot even prior to when the actual text of the sign may be readable to the pilot.

Also provided on a display is a ground speed indicator 170 and a turn velocity indicator 175. The ground speed indicator 170 provides the ground speed of the aircraft and the turn velocity indicator provides the maximum velocity the aircraft should be moving to negotiate the next turn. Further, a hold indicator 180 is provided. Hold indicator 180 provides the distance to the next hold line. Hold lines are painted lines on the airport runway or taxiway in which an aircraft should stop under certain conditions or when directed to do so by the aircraft controller.

These hold lines, as discussed later, may also be conformally mapped on the combiner, at specific times. In the exemplary embodiment depicted, a lower region of the head-up display, a plan form view or non-conformal view 190 is depicted. Plan form view 190 is a view of the aircraft and runway from a range 192 of a thousand feet above the aircraft. The aircraft 194 is depicted at its location on the runway 196. Further, runway signs 198 are provided in their relative geographic location on the map display. Conventionally, this information would be provided on an alternative display which was not a head-up display and therefore adding such information here to the head-up display provides further usability to the pilot such that the pilot does not have to look at both a conformal display on the head-up display and a non-conformal display which is displayed on a head-down display. The depicted combiner is provided as an example and the invention is not limited thereby. One skilled in the art will appreciate that the information displayed is not limiting.

The FAA may require replacement of incandescent runway lights with bright LED's. The LED's may be pulsed or modulated with a pseudorandom code or other code which the aircraft decodes to provide more reliable identification of the runway at larger distances than would otherwise be possible. The coding might also serve to uniquely identify specific runways.

In accordance with an exemplary embodiment, the LED runway lights may be used as an aid to accurately positioning the aircraft.

Appropriate coding of taxiway lights may help an automated surface guidance system ensure good registration with the edge lights for conformal mapping of the taxiing boundaries on the HUD. If the taxi lights were coded with the taxiway and distance information an accurate ground position could be derived without LAAS and with no multi-path problems. In accordance with at least some of the exemplary embodiments, the transmitted information is static, that is it is the same for all aircraft at all times. An additional extension would be to provide dynamic information like hold short, taxiway, and runway clear signals, that is tailored to the status of a particular aircraft. It may also be desirable to use the coding to transmit dynamic information to the aircraft to start and stop it as needed to prevent surface collisions.

Figure 2:
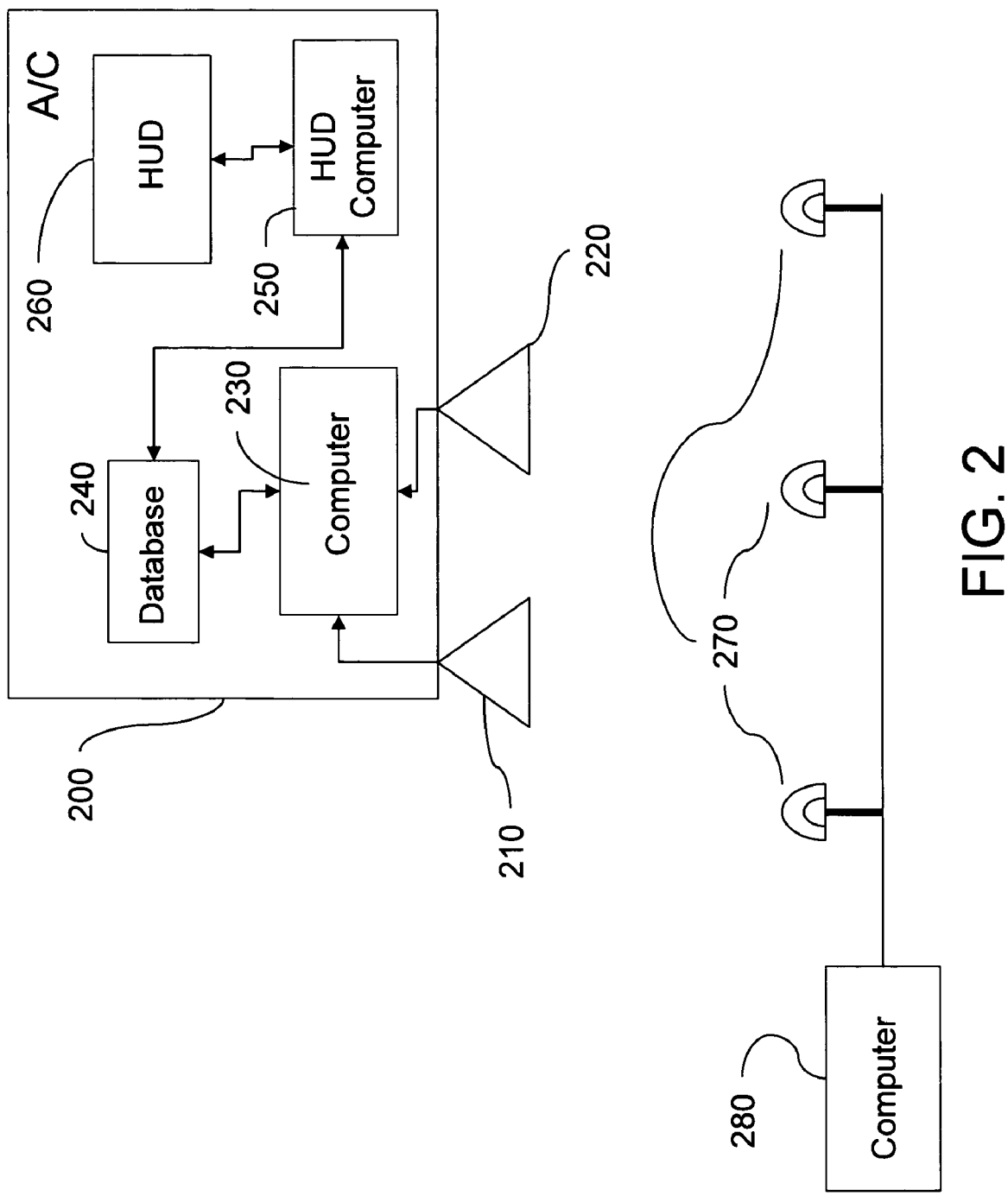
FIG. 2 is an exemplary block diagram of an aircraft with a taxiing light sensing system.

Referring now to FIG. 2, an aircraft 200 is depicted. Aircraft 200 comprises an optical sensor 210 which is configured to detect runway lights. It should be noted that the invention is not limited to any particular wavelength, rather any wavelengths may be used without departing from the scope of the claimed invention. Further, it should be appreciated that if other wavelengths are used, other appropriately tuned sensors may correspondingly be used. Other sensors 220 generically are depicted to represent a variety of other sensors which may be present on board aircraft 200, for example, GPS antenna, wind sensor, pressure sensor, etc. Sensors 210 and 220 may be coupled to a data bus and/or a computer 230 (such as a flight control computer, sensor computer, etc.). Computer 230 may be coupled to a database storing a variety of information, including but not limited to location information. Computer 230 may be coupled to a variety of devices, interfaces, information sources, hardware, etc., including but not limited to a HUD computer 250 (or other application specific processor) that is configured with memory, and logic to control HUD 260. HUD 260 may be any of a variety of HUD devices including but not limited to those having an image projector, refractive and reflective optics, and a combiner, among other elements. As well, HUD 260 may be representative of other types of displays, including but not limited to head-down displays (HDD), LCD displays, CRT displays, etc.

In accordance with an exemplary embodiment sensors 210 may be configured to receive light signals from a plurality of runway lights 270. Runway lights may be any of a variety of light types which are capable of optically transmitting a coded modulated signal. A coded signal may be generated by a computer 280 having a communication link (wired or wireless) to runway or taxiway lights 270. Runway or taxiway lights 270 have a processing circuit associated therewith for generating a modulated light signal transmitted by light 270. In accordance with an exemplary embodiment, each light may transmit its own unique information, such as an identification or location code. Further, because each light can transmit unique information, computer 230 may be used to derive location information from the signals received from one or more lights, either alone, or in combination with information from database 240. This location or position information may be generally used for aircraft during taxiing procedures. Further, it may be desirable for lights 270 to be controlled through computer 280 by a flight controller who is managing airport traffic to issue information to aircraft at specific locations via modulated signals on runway lights to provide indications of hold short, taxiway, and runway clear signals, among others.

It may also be desirable to use coding and a matched filter receiver to extend the effective range of lights in low visibility conditions. An analogous military application would be to use the encoding to permit the brightness of the lights to be reduced to make detection by the enemy more difficult. In that situation, the aircraft could respond with a similarly encoded infrared laser aimed based on the light configuration on the ground. The feedback would permit the light output to be gradually reduced as the aircraft gets closer thereby keeping the emissions to an absolute minimum. This may be particularly beneficial for aircraft carriers where there is a very strong desire to cloak the mother ship. The ability to send data via the lights may also be used on an aircraft carrier to transmit information regarding the motion of the deck.

Figure 3:
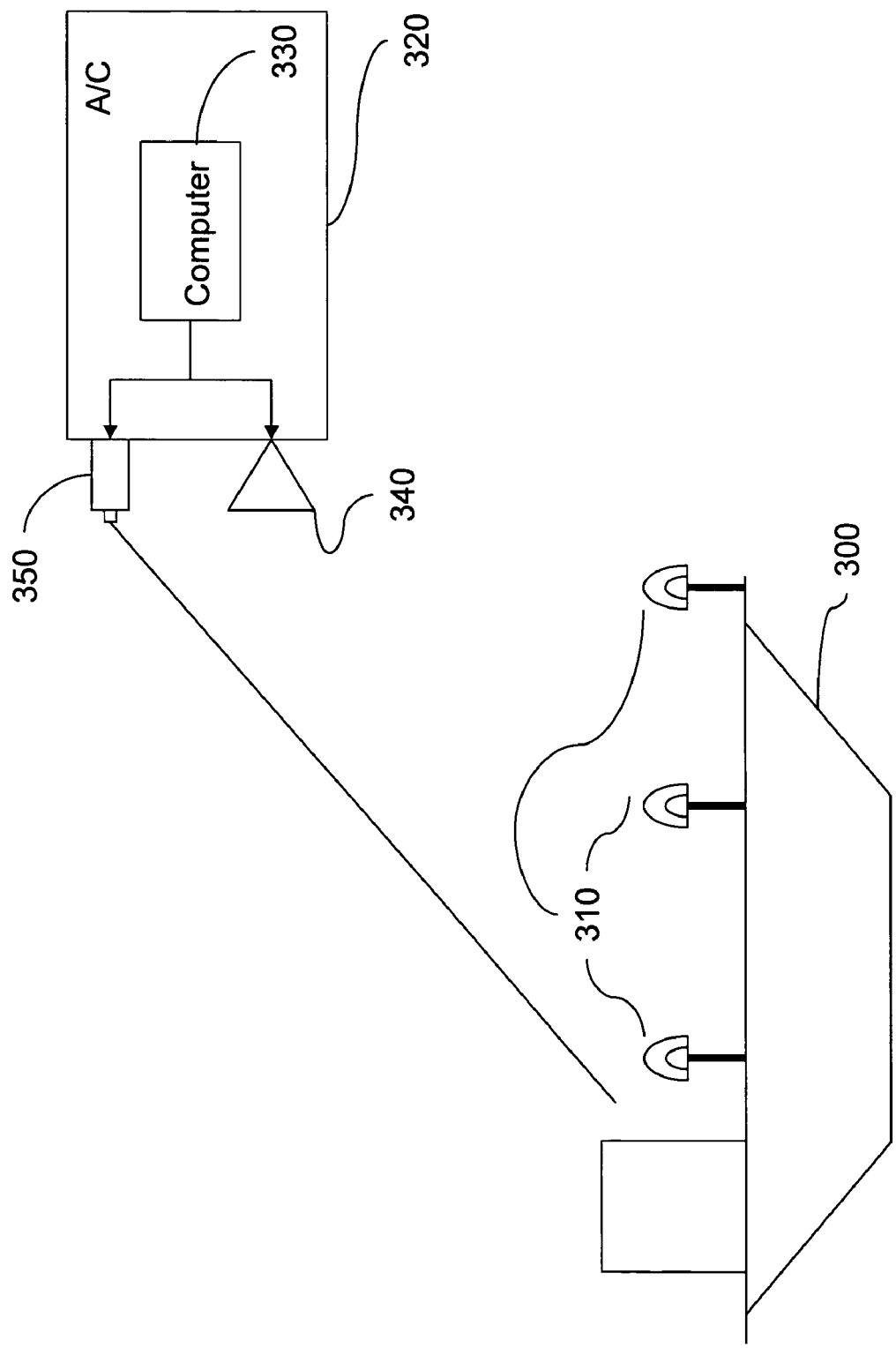
FIG. 3 is an exemplary block diagram of an aircraft carrier with a runway light modulating system.

Referring now to FIG. 3, an aircraft carrier 300 is depicted comprising LED deck runway lights 310 of a type as discussed with reference to the runway lights of FIG. 2. An aircraft 320 wanting to land in relatively low visibility conditions has need to sense deck runway lights 310, to make the proper approach and subsequent landing. A computer 320 on board aircraft 320 is configured to receive and interpret signals from sensor 340 which may be tuned to receive signals from each of runway deck lights 310. In doing so, a laser 350 (or other signal source) may provide a communications signal to aircraft carrier 300 that the light 310 signals are being received on the relative location of aircraft 320 to aircraft carrier 300. This may be done iteratively (or in any of a variety of manners and procedures) whereby at each iteration, as the aircraft is approaching, the light intensity may be lowered to keep the light intensity at some minimum level. This may help to prevent the detection of aircraft carrier 300 from enemies.

Because the flight deck of aircraft carrier 300 is in motion, due to propulsion, waves, and wind, it may be desirable, for more accurate automated approaches or landings, to communicate such motion to aircraft 320. This motion information may be coded and modulated on the signals transmitted by lights 310. Once received by aircraft 320, the motion information may be used to improve landings which are controlled either partially or solely by an automatic landing system.

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. An aircraft, comprising:
    a sensor tuned to receive light of a specific range of wavelengths, the light being emitted by one or more taxiway lights and the light from the taxiway lights having an informational signal modulated thereon the informational signal providing the locations of the taxiway lights;
    a processing system coupled to the sensor and configured with software to interpret the informational signal received by the sensor; and
    program code running on the processing system, the program code configured to determine the location of the aircraft on the taxiway based on the informational signal associated with the light received by the sensor from one or more of the taxiway lights, wherein the program code is configured to conformally map a representation of an outside boundary of a taxiway on a combiner of a HUD to line up closely with an outside view through the combiner the locations of the taxiway lights being used to ensure registration of the representation of the outside boundary with the taxiway lights.

2. The aircraft of claim 1, wherein the taxiway lights comprise LED lights.

3. The aircraft of claim 1, wherein the taxiway lights emit light in the near infrared spectrum.

4. The aircraft of claim 1, wherein the light from the taxiway lights is modulated with a pseudorandom code signal.

5. The aircraft of claim 1, wherein the light from the taxiway lights is modulated with a position identification signal.

6. The aircraft of claim 1, wherein the taxiway lights may be used to identify at least one aircraft movement command.

7. The aircraft of claim 1, further comprising:
    a display displaying a representation of the taxiway to the pilot.

8. The aircraft of claim 7, wherein the display is part of the HUD.

9. The aircraft of claim 8, wherein the representations are triangles having a vertex pointing in an up direction.

10. An aircraft taxiing system for a HUD providing an image on a combiner and for use with light being emitted by one or more taxiway lights and the light from the taxiway lights having an information signal modulated thereon, the information signal providing the locations of the taxiway lights, the aircraft taxiing system comprising:
    a sensor located on an aircraft and tuned to receive a specific range of wavelengths, wherein the sensor receives the light being emitted from the taxiway lights;
    a processing system coupled to the sensor and configured with software to interpret data related to the information signal associated with the light received by the sensor; and
    program code running on the processing system, the program code configured to conformally map a representation of an outside boundary of a taxiway on the combiner to line up with an outside view through the combiner using the locations of the taxiway lights determined from the data.

11. The aircraft taxiing system of claim 10, wherein the information signal is modulated with a pseudorandom code signal.

12. The aircraft taxiing system of claim 10, wherein the information signal is modulated with a position identification signal.

13. The aircraft taxiing system of claim 10, wherein the information signal may be used to identify at least one of hold short and runway clear signals.

14. The aircraft taxiing system of claim 10, further comprising:
   a display displaying a representation of the taxiway to the pilot.

15. The aircraft taxiing system of claim 14, wherein the representation of the outside boundary include a triangles.

16. The aircraft taxiing system of claim 15, wherein the triangles are registered with the taxiway.

\* \* \* \* \*